Figure 1:
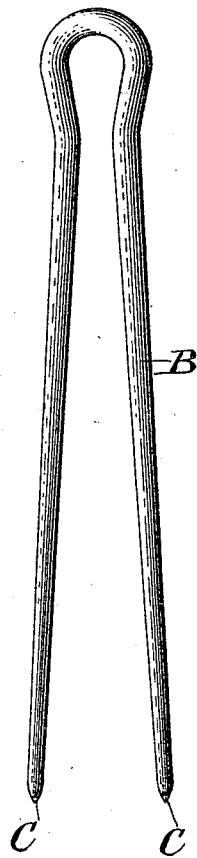
Figure 2:
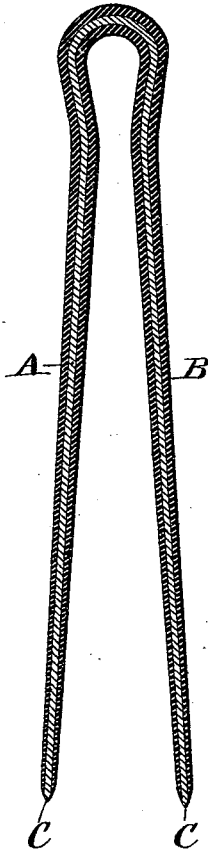

(No Model.)

W. KIEL.
HAIR PIN.

No. 552,480. Patented Dec. 31, 1895.

Witnesses
Albert B. Blackwood.
J. A. Saul.

Inventor
William Kiel,
by Fenelon B. Brock
Attorney

UNITED STATES PATENT OFFICE.

WILLIAM KIEL, OF BUTLER, NEW JERSEY, ASSIGNOR TO THE BUTLER HARD RUBBER COMPANY, OF NEW YORK, N. Y.

HAIR-PIN.

SPECIFICATION forming part of Letters Patent No. 552,480, dated December 31, 1895.

Application filed November 5, 1895. Serial No. 568,035. (No model.)

*To all whom it may concern:*

Be it known that I, WILLIAM KIEL, a citizen of the United States, residing at Butler, in the county of Morris and State of New Jersey, have invented certain new and useful Improvements in Hair-Pins; and I do declare the following to be a full, clear, and exact description of the invention, such as will enable others skilled in the art to which it appertains to make and use the same, reference being had to the letters of reference marked on the accompanying drawing, which forms a part of this specification.

My present invention relates to hair-pins. Plastic compositions are very desirable for use in the manufacture of hair-pins. Serious objection, however, arises in the employment thereof owing to the brittleness of the material, and frequent annoyance ensues by the frequent breaking of such hair-pins. To entirely obviate the breaking of such composition hair-pins and to provide the same with metal-shod points is the object of my invention.

With such object in view I provide the fragile composition hair-pin with a metal U-shaped core centrally disposed throughout the axis of the hair-pin and exposed at the points, thereby strengthening the pin and rendering it unbreakable.

The drawing illustrates a hair-pin embodying my invention.

A is a steel U-shaped core of any desired shape extending centrally throughout both legs of the pin and through the head thereof.

B is the hardened composition mass within which the core is embedded. The composition and core form a solid homogeneous connected whole.

The ends C of the U-shaped core extend out beyond the hardened composition, which latter is tapered about the exposed points. As a result I produce a hardened composition hair-pin having metal-shod points.

Any suitable composition may be employed. Hard rubber provided with a metal core forms an excellent composition for the manufacture of hair-pins. The hard rubber is vulcanized upon the metal, whereby the whole becomes in every part a rigidly connected practically integral article having the desirable qualities of flexibility and entire absence of brittleness.

The metal core of the hair-pin may be in the form of a spiral wire, or other desired shape.

The tapered points of composition hair-pins are liable to break unless reinforced by metal which extends clear through the point, forming a metallic-pointed composition pin.

I claim—

A hair pin made of a plastic composition and provided with a centrally disposed metal core embedded therein exposed at each pin point, substantially and for the purposes described.

In testimony whereof I affix my signature in the presence of two witnesses.

WILLIAM KIEL.

Witnesses:
GEO. J. FRITZ,
JOS. F. MCLEAN.